United States Patent
Cook et al.

(10) Patent No.: US 10,280,769 B2
(45) Date of Patent: May 7, 2019

(54) NONMETALLIC AIRFOIL WITH A COMPLIANT ATTACHMENT

(71) Applicant: United Technologies Corporation, Hartford, CT (US)

(72) Inventors: Grant O. Cook, Tolland, CT (US); Benjamin T. Fisk, East Grandby, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 402 days.

(21) Appl. No.: 15/025,784

(22) PCT Filed: Apr. 17, 2014

(86) PCT No.: PCT/US2014/034497
§ 371 (c)(1),
(2) Date: Mar. 29, 2016

(87) PCT Pub. No.: WO2015/047450
PCT Pub. Date: Apr. 2, 2015

(65) Prior Publication Data
US 2016/0245090 A1    Aug. 25, 2016

Related U.S. Application Data

(60) Provisional application No. 61/884,446, filed on Sep. 30, 2013.

(51) Int. Cl.
*F01D 5/14* (2006.01)
*F01D 5/28* (2006.01)
(Continued)

(52) U.S. Cl.
CPC .......... *F01D 5/3084* (2013.01); *B23K 20/023* (2013.01); *C04B 37/026* (2013.01);
(Continued)

(58) Field of Classification Search
CPC ........ F01D 5/147; F01D 5/3084; F01D 5/282; F01D 5/284; F01D 5/30; F01D 5/303;
(Continued)

(56) References Cited

U.S. PATENT DOCUMENTS 3,883,267 A * 5/1975 Baudier .................. F01D 5/282
416/230
4,040,770 A * 8/1977 Carlson .................. C22C 47/00
416/230
(Continued)

FOREIGN PATENT DOCUMENTS

EP    0109814 A2 *  5/1984    .......... C04B 37/025
EP    2466071 A2    6/2012
(Continued)

OTHER PUBLICATIONS

Schaeffler, Daniel J. "The differences between stiffness and strength in metal" posted on Dec. 1, 2015. Accessed from https://www.thefabricator.com/article/metalsmaterials/the-differences-between-stiffness-and-strength-in-metal.*
(Continued)

*Primary Examiner* — Igor Kershteyn
*Assistant Examiner* — Topaz L. Elliott
(74) *Attorney, Agent, or Firm* — Cantor Colburn LLP

(57) ABSTRACT

An airfoil is disclosed. The airfoil may comprise a body portion having a leading edge, a trailing edge, a pressure side, and a suction side. The airfoil may further comprise a compliant attachment bonded to the body portion and the compliant attachment may be configured to connect to a support structure. The compliant attachment may have a coefficient of thermal expansion intermediate between a coefficient of the thermal expansion of the body portion of the airfoil and a coefficient of thermal expansion of the support structure.

10 Claims, 5 Drawing Sheets

(51) Int. Cl.
- *F01D 5/30* (2006.01)
- *F01D 9/04* (2006.01)
- *B23K 20/02* (2006.01)
- *C04B 37/02* (2006.01)
- *B23K 101/00* (2006.01)

(52) U.S. Cl.
CPC ............ *F01D 5/147* (2013.01); *F01D 5/282* (2013.01); *F01D 5/284* (2013.01); *F01D 5/30* (2013.01); *F01D 9/041* (2013.01); *B23K 2101/001* (2018.08); *C04B 2237/38* (2013.01); *C04B 2237/385* (2013.01); *C04B 2237/62* (2013.01); *C04B 2237/84* (2013.01); *F05D 2220/32* (2013.01); *F05D 2230/236* (2013.01); *F05D 2230/237* (2013.01); *F05D 2300/10* (2013.01); *F05D 2300/50212* (2013.01); *F05D 2300/6033* (2013.01); *Y02T 50/672* (2013.01)

(58) Field of Classification Search
CPC .... F01D 5/3038; F01D 5/3007; F01D 5/3015; F01D 5/3092; F04D 29/325; F04D 29/542; F05D 2300/50212; F05D 2300/5021; F05D 2300/50211; F05D 2300/6033; B23P 5/00
See application file for complete search history.

(56) References Cited

U.S. PATENT DOCUMENTS

| | | | | |
|---|---|---|---|---|
| 4,417,854 A | * | 11/1983 | Cain | F01D 5/284 416/219 R |
| 4,563,128 A | * | 1/1986 | Rossmann | F01D 5/284 416/225 |
| 4,602,731 A | * | 7/1986 | Dockus | B23K 35/001 228/121 |
| 4,802,824 A | * | 2/1989 | Gastebois | F01D 5/282 416/193 A |
| 5,732,468 A | * | 3/1998 | Galley | B23K 1/0018 29/889.1 |
| 6,582,812 B1 | * | 6/2003 | Grylls | B22F 7/006 428/307.7 |
| 6,617,037 B2 | * | 9/2003 | Sun | C04B 41/009 416/241 B |
| 6,648,596 B1 | * | 11/2003 | Grylls | C23C 30/00 164/9 |
| 7,614,238 B2 | * | 11/2009 | Mulera | F01D 19/00 60/39.281 |
| 7,950,146 B2 | * | 5/2011 | Arrell | B21J 1/00 29/889.2 |
| 8,173,206 B2 | * | 5/2012 | Boutwell | B23P 6/005 313/498 |
| 9,175,571 B2 | * | 11/2015 | Floyd | F01D 5/284 |
| 10,099,306 B2 | * | 10/2018 | Cook, III | B23K 1/0018 |
| 2009/0269497 A1 | * | 10/2009 | Yousefiani | B22F 3/1055 427/258 |
| 2009/0293497 A1 | | 12/2009 | Cloft | |
| 2011/0305578 A1 | * | 12/2011 | Smarsly | B23K 20/1205 416/223 R |
| 2012/0007286 A1 | | 1/2012 | Shi | |
| 2012/0163986 A1 | | 6/2012 | Darkins, Jr. et al. | |
| 2012/0171039 A1 | * | 7/2012 | Huang | F01D 5/282 416/219 R |
| 2013/0004326 A1 | * | 1/2013 | McCaffrey | F01D 5/147 416/241 B |
| 2013/0115089 A1 | * | 5/2013 | McCaffrey | F01D 5/3061 416/213 R |
| 2013/0171001 A1 | * | 7/2013 | Garcia-Crespo | F01D 5/3007 416/241 B |
| 2016/0153659 A1 | * | 6/2016 | Cook, III | F23R 3/60 60/753 |
| 2016/0326891 A1 | * | 11/2016 | Roach | F01D 5/282 |
| 2016/0326892 A1 | * | 11/2016 | Cook, III | F01D 5/284 |

FOREIGN PATENT DOCUMENTS

| | | |
|---|---|---|
| EP | 2540965 A2 | 1/2013 |
| EP | 2589755 A2 | 5/2013 |
| FR | 2608674 A1 | 6/1988 |
| JP | 2013139765 A | 7/2013 |

OTHER PUBLICATIONS

Agilent Technologies, "Laser and Optics User's Manual" Chapter 17, Jul. 2002. retrieved from https://psec.uchicago.edu/thermal_coefficients/cte_metals_05517-90143.pdf.*
Cook III, Grant and Sorenson, Carl. Overview of transient liquid phase and partial transient liquid phase bonding</i>. 46 J. of Material Science, 5305-5323 (May 2011), https://link.springer.com/article/10.1007/s10853-011-5561-1 (last visited Dec. 4, 2018) (Year: 2011).*
Kim, JJ et al. Interfacial microstructure of partial transient liquid phase bonded Si3N4 to Inconel 718 joints. 344 Materials Science and Engineering A, 240-244 (Mar. 2003), https://www.sciencedirect.com/science/article/pii/S0921509302004021?via%3Dihub (last visited Dec. 4, 2018). (Year: 2003).*
European Search Report Application No. EP 14 84 9586.
"Novel joining of dissimilar ceramics in the Si3N4—Al2O3 system using polytypoid functional gradients"; Lee, Caroline Sunyong; Aug. 22, 2001.
English Translation to JP2013139765 Abstract.
International Search Report for Application No. PCT/US2014/034497; dated Mar. 31, 2015.
Written Opinion for Application No. PCT/US2014/034497; dated Mar. 31, 2015.

* cited by examiner

NONMETALLIC AIRFOIL WITH A COMPLIANT ATTACHMENT

FIELD OF DISCLOSURE

The present disclosure generally relates to airfoils, and more specifically, relates to a nonmetallic airfoil having a compliant attachment that is capable of mitigating thermally-induced strain between the nonmetallic airfoil and a metallic support structure such as a rotor or a hub.

BACKGROUND

Gas turbine engines, such as those used to provide thrust for an aircraft, typically include a fan section, a compressor section, combustors, and turbines positioned sequentially in an upstream to downstream arrangement. In operation, air may be drawn into the engine, accelerated by the fan section, and then pressurized in the compressor section. After passing through the compressor section, the air may be mixed with fuel and combusted in the combustors to generate hot combustion gases. The hot combustion gases may then expand through and drive the turbines which may, in turn, drive the compressor section and the fan section by driving the rotation of an interconnecting shaft. After passing through the turbines, the air may be exhausted through an exhaust nozzle to provide some of the propulsive thrust to an associated aircraft or to provide power if used in land-based operations.

The fan section, the compressor section, and the turbines of a gas turbine engine may each include a plurality of airfoils which may be rotating blades or non-rotating stator vanes. The airfoils may be involved in altering the pressure, velocity, or direction of the air or gas flow. The airfoils typically include a root portion that is received by a support structure such as a rotor or a hub. For example, the support structure may have a slot with a shape that is complementary to the root portion of the airfoil.

Airfoils formed from nonmetallic materials, such as ceramic or ceramic matrix composite materials, may be advantageous for gas turbine engine applications because they may be relatively lightweight, high in strength, and/or thermally resistant. While nonmetallic airfoils are effective for these reasons, it may be challenging in some cases to provide a robust connection between the root portion of the nonmetallic airfoil and a corresponding slot of a support structure that is formed from a metallic material. In particular, mismatches in the coefficients of thermal expansion (CTE) of the nonmetallic material of the airfoil and the metallic material of the support structure may cause significant thermal strain at the connection interface upon exposure to large temperature differences or repeated thermal cycling.

An attempt to mitigate contact damage stress between nonmetallic airfoil roots and metallic support structures has been described in U.S. Pat. No. 6,132,175. This system utilizes a multi-layer compliant sleeve that slideably engages a ceramic airfoil root and rests between the ceramic airfoil root and a metallic support slot during operation to prevent airfoil fracture. However, additional enhancements that may provide improved performance capabilities are still wanting.

Clearly, there is a need for strategies that provide a robust connection between nonmetallic airfoils and metallic support structures having thermal expansion mismatches.

SUMMARY

In accordance with one aspect of the present disclosure, an airfoil is disclosed. The airfoil may comprise a body portion having a leading edge, a trailing edge, a pressure side, and a suction side. The airfoil may further comprise a compliant attachment that may be bonded to the body portion. The compliant attachment may be configured to connect to a support structure and it may have a coefficient of thermal expansion intermediate that is between a coefficient of thermal expansion of the body portion and a coefficient of thermal expansion of the support structure.

In another refinement, the body portion of the airfoil may be formed from a nonmetallic material and the support structure may be formed from a metallic material.

In another refinement, the compliant attachment may be formed from a nonmetallic material.

In another refinement, the compliant attachment may be formed from a metallic material.

In another refinement, the compliant attachment may be bonded to the body portion of the airfoil by transient liquid phase bonding.

In another refinement, the compliant attachment may be bonded to the body portion of the airfoil by partial transient liquid phase bonding.

In another refinement, the compliant attachment may be bonded to the body portion of the airfoil by brazing.

In another refinement, the compliant attachment may form a root portion of the airfoil.

In another refinement, the compliant attachment may have a stiffness that is lower than a stiffness of the body portion and less than a stiffness of the support structure.

In another refinement, the nonmetallic material of the body portion may comprise ceramic.

In another refinement, the nonmetallic material of the body portion may comprise a ceramic matrix composite.

In accordance with another aspect of the present disclosure, an airfoil assembly is disclosed. The airfoil assembly may comprise a support structure and a plurality of airfoils. Each of the plurality of airfoils may have a body portion comprising a leading edge, a trailing edge, a pressure side, and a suction side. In addition, each of the plurality of airfoils may have a compliant attachment bonded to a bottom surface of the body portion. The compliant attachment may be connected to the support structure and it may have a coefficient of thermal expansion that is intermediate between a coefficient of thermal expansion of the body portion and a coefficient of thermal expansion of the support structure.

In another refinement, the support structure may be formed from a metallic material and the body portion of the airfoil may be formed from a nonmetallic material.

In another refinement, the compliant attachment may be bonded to the body portion of the airfoil by a bonding method selected from the group consisting of transient liquid phase bonding, partial transient liquid phase bonding, and brazing.

In another refinement, the compliant attachment may be formed from a material selected from the group consisting of a nonmetallic material and a metallic material.

In accordance with another aspect of the present disclosure, a gas turbine engine is disclosed. The gas turbine engine may comprise a fan section, a compressor section downstream of the fan section, a combustor downstream of the compressor section, a turbine downstream of the combustor, and a nacelle surrounding the fan section, the compressor section, the combustor, and the turbine. The gas turbine engine may further comprise at least one airfoil assembly located in at least one of the fan section, the compressor section, and the turbine. The airfoil assembly may comprise a support structure and a plurality of airfoils each having a body portion comprising a leading edge, a trailing edge, a pressure side, and a suction side. Each of the plurality of airfoils may have a compliant attachment bonded to a bottom surface of the body portion and the compliant attachment may be connected to the support structure. The compliant attachment may have a coefficient of thermal expansion that is intermediate between a coefficient of thermal expansion of the body portion and a coefficient of thermal expansion of the support structure.

In another refinement, the body portion of the airfoil may be formed from a nonmetallic material and the support structure may be formed from a metallic material.

In another refinement, the compliant attachment may be bonded to the body portion of the airfoil by a bonding method selected from the group consisting of transient liquid phase bonding, partial transient liquid phase bonding, and brazing.

These and other aspects and features of the present disclosure will be more readily understood when read in conjunction with the accompanying drawings.

It should be understood that the drawings are not necessarily drawn to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments disclosed herein.

DETAILED DESCRIPTION

Figure 1:
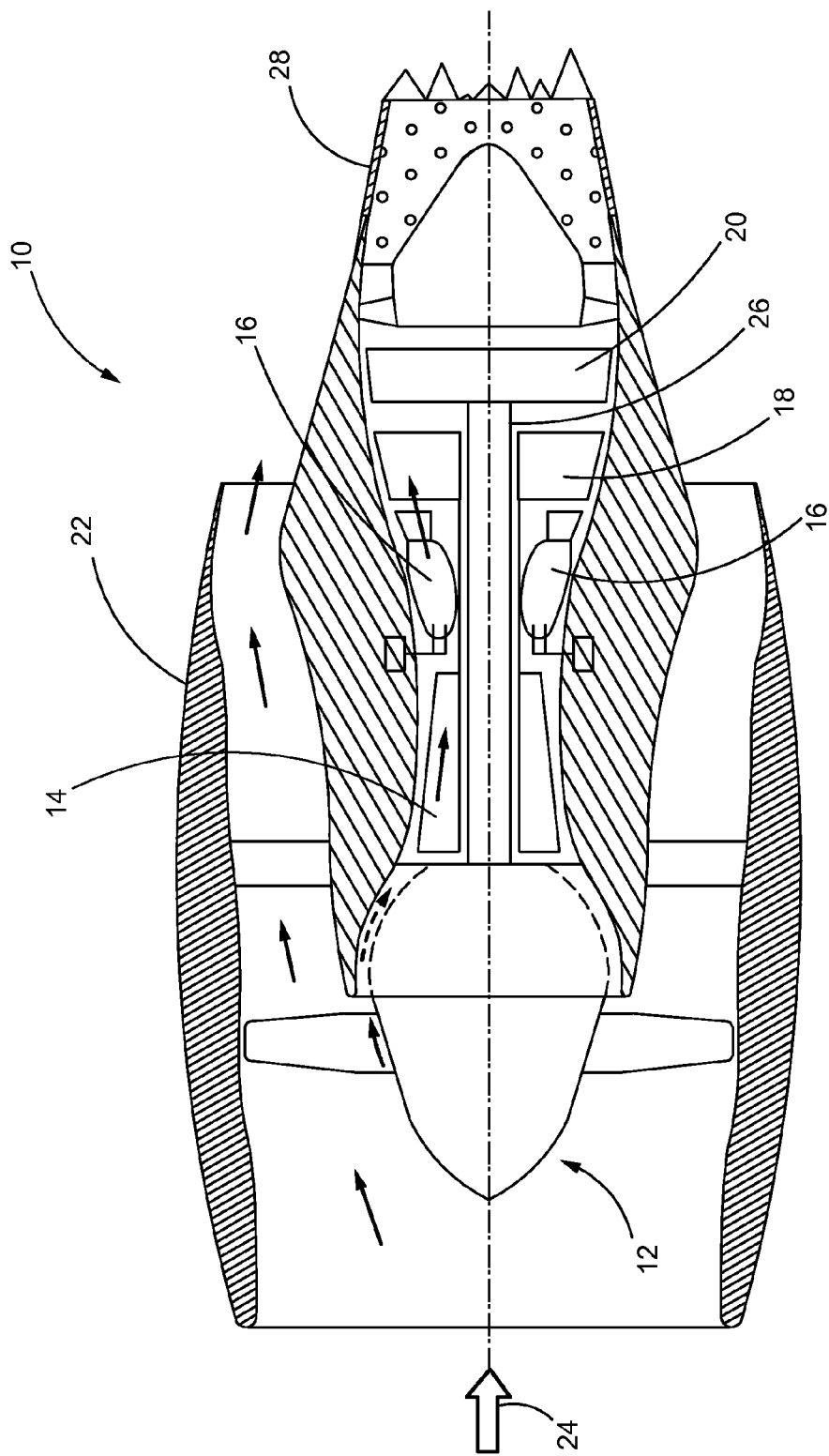
FIG. 1 is a cross-sectional view of a gas turbine engine, constructed in accordance with the present disclosure.

Referring now to the drawings, and with specific reference to FIG. 1, a gas turbine engine 10 in accordance with the present disclosure is depicted. In an upstream to downstream direction, the gas turbine engine 10 may consist of a fan section 12, a compressor section 14 (which may include both a low-pressure compressor and a high-pressure compressor), combustors 16, and turbines 18 and 20, all of which may be surrounded by a nacelle 22, as shown.

In normal operation, air 24 may be drawn into the engine 10 and accelerated by the fan section 12. After passing the fan section 12, a part of the air 24 may be routed through the compressor section 14, the combustors 16, and the turbines 18 and 20. More specifically, the air 24 may first be compressed and pressurized in the compressor section 14 and it may then be mixed with fuel and combusted in the combustors 16 to generate hot combustion gases. The hot combustion gases may then expand through and drive the turbines 18 and 20 which may, in turn, drive the compressor section 14 and the fan section 12 by driving the rotation of an interconnecting shaft 26. After passing through the turbines 18 and 20, the gases may be exhausted through an exhaust nozzle 28 to provide some of the propulsive thrust to an associated aircraft or to provide power if used in land-based operations. The operation of rotating airfoils (i.e., blades) or non-rotating airfoils (i.e., stator vanes) in the fan section 12, the compressor section 14, and the turbines 18 and 20 may be important for the operation of the gas turbine engine 10 as they may be involved in altering the pressure, velocity, and/or direction of the air or gas flow.

Figure 2:
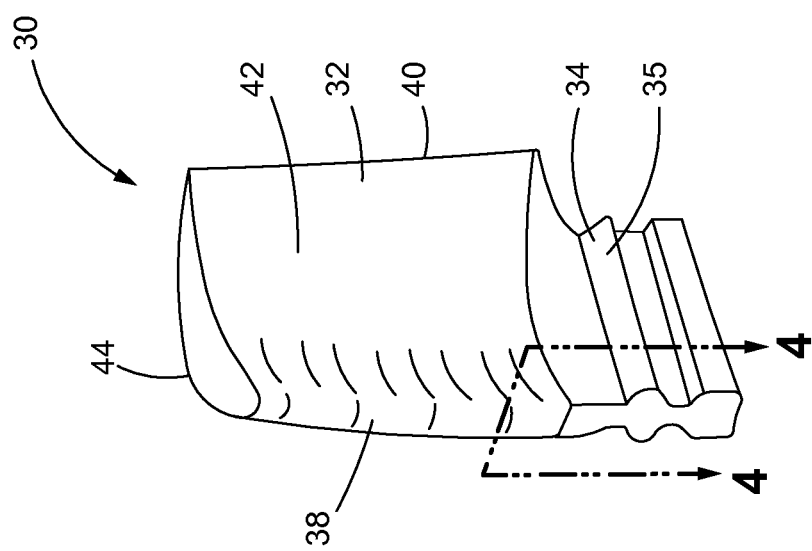
FIG. 2 is a perspective view of an airfoil having a nonmetallic body portion and a compliant attachment, constructed in accordance with the present disclosure.

Turning now to FIG. 2, an airfoil 30 in accordance with the present disclosure is shown. The airfoil 30 may be an airfoil for use in the gas turbine engine 10 or another relevant machine, such as a wind turbine. As non-limiting examples, the airfoil 30 may be a rotating blade in the fan section 12, the compressor section 14, or one of the turbines 18 or 20 of the gas turbine engine 10. As other non-limiting possibilities, it may be a stator vane in the compressor section 14 or the turbines 18 or 20 of the gas turbine engine. In this regard, the airfoil 30 may have any structure suitable for its intended use and, in practice, may deviate from the structure shown in FIG. 2. The airfoil 30 may consist of a body portion 32 and a compliant attachment 34 which may be bonded to the body portion 32. The compliant attachment 34 may form a root portion 35 of the airfoil 30 and it may be configured to connect to a support structure 36 which may be a rotor, a hub, an end wall, or another type of airfoil support structure (see FIG. 3). The body portion 32 of the airfoil and the support structure 36 may have differing thermal properties and/or compliance properties (i.e., responsiveness to force). Importantly, the compliant attachment 34 may assist in alleviating thermal and/or mechanical strain between the body portion 32 of the airfoil 30 and the support structure 36 (see further details below).

The body portion 32 may have a leading edge 38, a trailing edge 40, a pressure side 42, and a suction side 44, the respective functions of which are well-understood by those with ordinary skill in the art. In addition, the body portion 32 may be formed from a nonmetallic material such as, but not limited to, a ceramic material, a ceramic matrix composite, or another suitable nonmetallic material. If it is formed from a ceramic matrix composite, it may consist of a ceramic matrix reinforced with fibers such as, but not limited to, ceramic fibers, carbon fibers, metallic fibers, or glass fibers.

Figure 3:
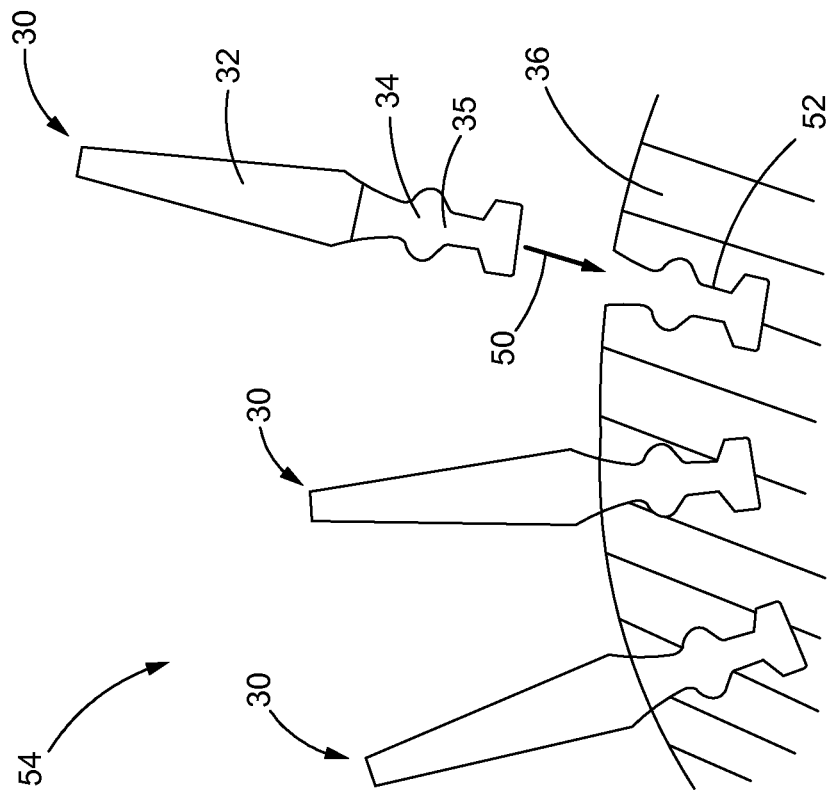
FIG. 3 is a front, partially sectioned view, illustrating a mechanical connection of the airfoil of FIG. 2 to a support structure, constructed in accordance with the present disclosure.

The support structure 36 may be formed from a metallic material and it may be configured to receive the compliant attachment/root portion of the airfoil 30 by a mechanical connection 50, as shown in FIG. 3. More specifically, the support structure 36 may have a slot 52 having a shape that is complimentary to compliant attachment 34/root portion 35 of the airfoil 30 such that the compliant attachment 34 may be mechanically inserted into the slot 52. However, depending on the application, other types of mechanical connections or attachment methods may also be employed. In some arrangements, such as the arrangement depicted in FIG. 2, the compliant attachment 34 may prevent direct contact between the nonmetallic body portion 32 and the metallic support structure 36.

The support structure 36 may receive a plurality of the airfoils 30 to form an airfoil assembly 54, as shown in FIG. 3. The airfoil assembly 54 may be various structures such as, but not limited to, the fan section 12 or a rotating airfoil assembly in the compressor section 14 or one of the turbines (18 or 20) of the gas turbine engine 10. As other non-limiting possibilities, the airfoil assembly 54 may be a non-rotating stator vane assembly in the compressor section 14 or in one of the turbines (18 or 20).

Importantly, the compliant attachment 34 of the airfoil 30 may be formed from a material having thermal properties that are intermediate between the thermal properties of the body portion 32 and the support structure 36. More specifically, the compliant attachment 34 may be formed from any suitable metallic or nonmetallic material having a coefficient of thermal expansion (CTE) that is intermediate between the CTE of the nonmetallic material forming the body portion 32 of the airfoil 30 and the CTE of the metallic material forming the support structure 36. Furthermore, the compliant attachment 34 may have a stiffness that is lower than the stiffness of the nonmetallic body portion 32 and the metallic support structure 36. As a result of its intermediate thermal properties and its lower stiffness, the compliant attachment 34 may mitigate or absorb at least some of any thermally induced strain between nonmetallic body portion 32 and the metallic support structure 36. Such thermally induced strain may be caused by exposure of the airfoil assembly 54 to temperature fluctuations during operation and the differing thermal properties (CTE in particular) of the body portion 32 and the support structure 36. In this way, the compliant attachment 34 may improve the robustness of the mechanical connection 50 and possibly extend the operative lifetime of the airfoil 30 and the airfoil assembly 54. It is in this regard that the present disclosure greatly improves over the prior art.

Figure 5:
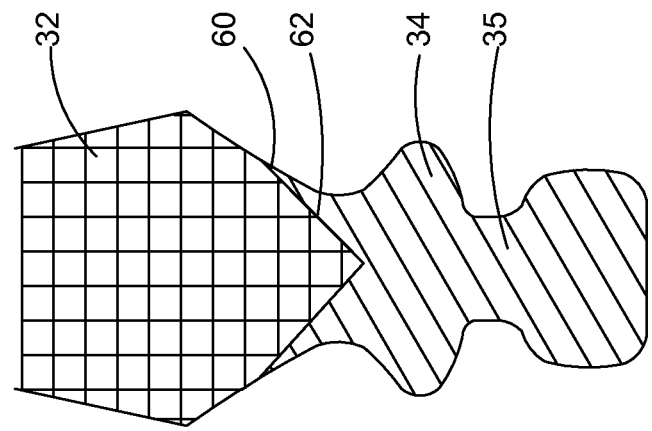
FIG. 5 is a cross-sectional view similar to FIG. 4, but having a "V-shaped" bond line, constructed in accordance with the present disclosure.
Figure 4:
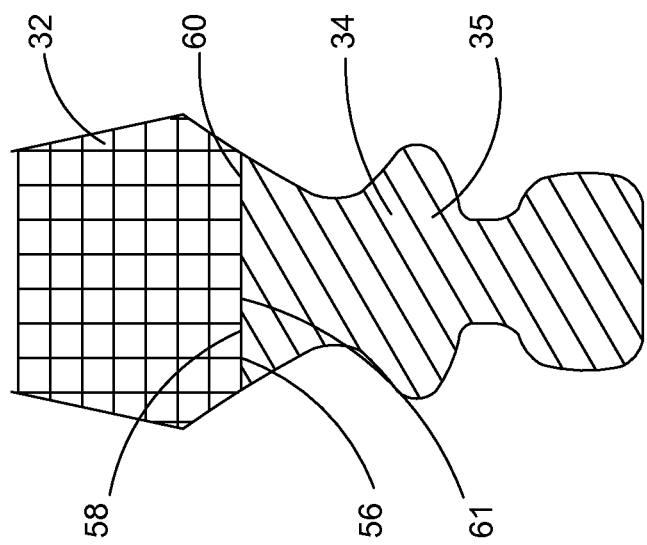
FIG. 4 is a cross-sectional view of the airfoil of FIG. 2 taken along the line 4-4 of FIG. 2, illustrating a straight bond line between the nonmetallic body portion and the compliant attachment, constructed in accordance with the present disclosure.

An upper surface 56 of the compliant attachment 34 may be bonded to a bottom surface 58 of the body portion 32 along a bonding interface 60, as shown in FIG. 4. Depending on the materials forming the body portion 32 and the compliant attachment 34, as well as their respective manufacturing constraints, the bonding interface 60 may exist as a straight bond line 61 (FIG. 4), a "V-shaped" bond line 62 (see FIG. 5), or any other suitable bond line shape.

The compliant attachment 34 may be bonded to the bottom surface 58 of the body portion 32 by any conventional joining process apparent to those skilled in the art such as, but not limited to, transient liquid phase (TLP) bonding, partial transient liquid phase (PTLP) bonding, or brazing. However, in some circumstances, TLP bonding and PTLP bonding may be preferred bonding methods due to the refractory nature of the resulting bonds. In particular, the bond between the body portion 32 and the compliant attachment 34 formed by TLP or PTLP bonding may have a melting temperature that exceeds the bonding temperature that is used to form the bond. This feature could be beneficial, for example, for high-stress and/or high-temperature applications or when employing temperature-sensitive materials.

Various bonding material formats may be employed for joining the body portion 32 and the compliant attachment 34 by TLP bonding, PTLP bonding, brazing, or another suitable method. Suitable bonding material formats may include, but are not limited to, an alloy foil, a foil formed from a pure metal, multiple layers of elemental foils, or combinations thereof. Other formats such as, but not limited to, powder, powder compact, braze paste, sputtered layer, or one or more metallic layers applied by electroplating, physical vapor deposition, or another suitable metal deposition process, may also be used. Notably, the bonding materials used to join the body portion 32 and the compliant attachment 34 may be selected to further accommodate any thermal expansion and/or compliance mismatches between the body portion 32 and the support structure 36.

Although apparent to those with ordinary skill in the art, the general mechanism of TLP and PTLP bonding in accordance with the present disclosure will now be described. The TLP and PTLP bonding processes may both involve the initial application of an interlayer at the bonding interface 60 between the nonmetallic body portion 32 and the compliant attachment 34. Alternatively, the interlayer may be applied on the periphery of the bonding interface 60 and may be allowed to flow into the bonding interface 60 by capillary action. In TLP bonding, the interlayer may consist of a single layer, whereas in PTLP bonding the interlayer may consist of multiple layers (see FIGS. 6-9 and further details below). Following the application of the interlayer, both the TLP and the PTLP bonding processes may involve the progressive heating of the interlayer to a bonding temperature. Prior to reaching the bonding temperature, the interlayer may at least partially melt/liquefy by direct or eutectic melting. Upon reaching the bonding temperature, isothermal solidification may occur until all of the liquid has solidified. As explained in the following paragraphs, additional details of the TLP and PTLP bonding mechanisms may vary depending on which bonding process is used (TLP or PTLP) and on the material (i.e., metallic or nonmetallic) forming the compliant attachment 34.

Figure 6:
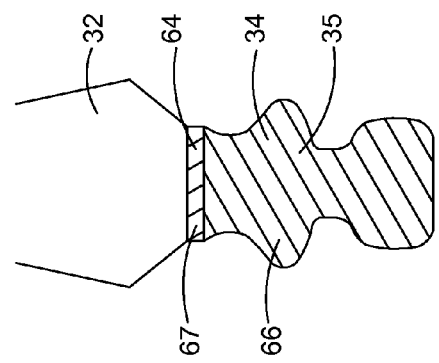
FIG. 6 is a front, partially sectioned view of an exemplary interlayer for bonding the nonmetallic body portion to a nonmetallic compliant attachment by transient liquid phase bonding, constructed in accordance with the present disclosure.

Referring now to FIG. 6, an exemplary interlayer 64 for joining the nonmetallic body portion 32 to a compliant attachment 34 formed from a nonmetallic material 65 by TLP bonding is depicted. The interlayer 64 may be applied at the bonding interface 60 (i.e., between the bottom surface 58 of the body portion 32 and the upper surface 56 of the compliant attachment 34), as shown. In the arrangement depicted in FIG. 6, the interlayer 64 may be formed from a suitable nonmetallic material such as, but not limited to, aluminum oxide ($Al_2O_3$) joined with boron trioxide ($B_2O_3$). Furthermore, the interlayer 64 may exist as one or more of the above-described bonding material formats (i.e., a foil, powder, sputtered layer, etc.). During the TLP bonding process, at least one reactive element from the liquefied portion of the interlayer 64 may wet/adhere to the nonmetallic material of the body portion 32 and the nonmetallic material 65 of the compliant attachment 34 to form a bond therebetween.

Figure 7:
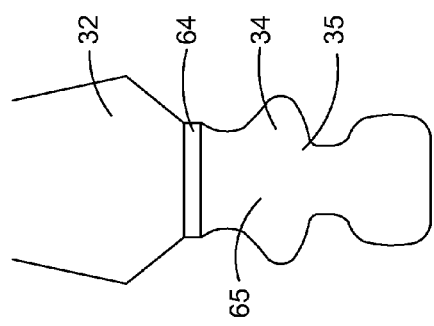
FIG. 7 is a front, partially sectioned view of an exemplary interlayer for bonding the nonmetallic body portion to a metallic compliant attachment by transient liquid phase bonding, constructed in accordance with the present disclosure.

An exemplary interlayer 64 for joining the nonmetallic body portion 32 to a compliant attachment 34 formed from a metallic material 66 by TLP bonding is shown in FIG. 7. In this case, the interlayer 64 may consist of a metallic material 67 and it may exist as one or more of the above-described bonding material formats (i.e., an alloy foil, powder, braze paste, etc.). During the TLP bonding process, wetting of the nonmetallic body portion 32 may be achieved by at least one reactive element in the interlayer 64 or at least one reactive element in the metallic compliant attachment 34 that is exposed to the nonmetallic body portion 32 during the melting and/or isothermal solidification steps. In addition, during melting and/or isothermal solidification, at least one reactive element from the interlayer 64 may diffuse into the metallic compliant attachment 34. The wetting/diffusion processes may assist in forming a bond between the body portion 32 and the compliant attachment 34.

Figure 8:
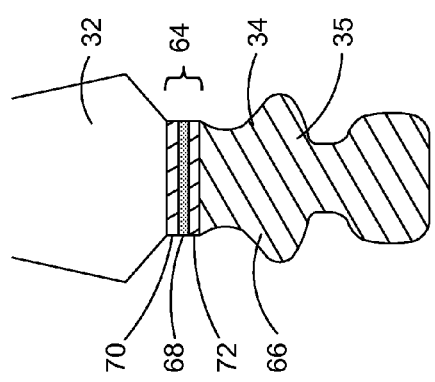
FIG. 8 is a front, partially sectioned view of an exemplary interlayer for bonding the nonmetallic body portion to a nonmetallic compliant attachment by partial transient liquid phase bonding, constructed in accordance with the present disclosure.

Referring now to FIG. 8, an exemplary interlayer 64 for joining the nonmetallic body portion 32 to a compliant attachment 34 formed from a nonmetallic material 65 by PTLP bonding is depicted. As shown, the interlayer 64 may consist of multiple layers including a refractory core 68 between two thinner layers (an upper layer 70 and a lower layer 72). Alternatively, multiple thinner layers may exist on each side of the refractory core 68. The refractory core 68 may consist of a pure metal or an alloy, and the upper layer 70 and the lower layer 72 may consist of the same metallic material or different metallic materials to provide an asymmetric bond set-up. In addition, the refractory core 68 may have a higher melting temperature than the upper layer 70 and the lower layer 72 such that it does not melt during the PTLP bonding process. Furthermore, the refractory core 68, the upper layer 70, and the lower layer 72 may each exist as one of the above-described bonding material formats (i.e., an alloy foil, multiple layers of foil, powder, powder compact, etc.). During the PTLP bonding process, the upper layer 70 and the lower layer 72 may melt (by direct melting or by eutectic melting if a eutectic product is formed between the thinner layers and the refractory core or the substrate materials) and isothermally solidify as described above. During these stages, the upper layer 70 and the lower layer 72 may diffuse into the refractory core 68 and at least one reactive element from the upper layer 70, the lower layer 72, and/or the refractory core 68 may simultaneously wet/adhere to the nonmetallic body portion 32 and the non-metallic compliant attachment 34 to assist in forming a bond therebetween.

Figure 9:
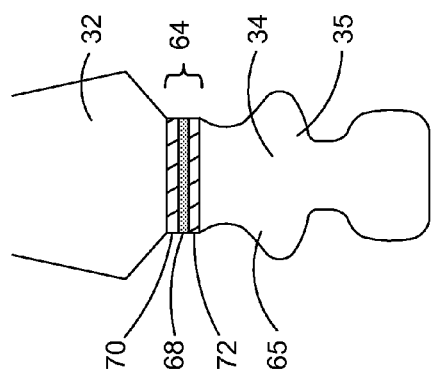
FIG. 9 is a front, partially sectioned view of an exemplary interlayer for bonding the nonmetallic body portion to a metallic compliant attachment by partial transient liquid phase bonding, constructed in accordance with the present disclosure.

FIG. 9 shows an exemplary interlayer 64 for joining the nonmetallic body portion 32 to a compliant attachment 34 formed from a metallic material 66 by PTLP bonding. As can be seen, the interlayer 64 may consist of the refractory core 68 between two thinner layers (the upper layer 70 and the lower layer 72). As explained above, multiple thinner layers on each side of the refractory core 68 may also be used as an alternative arrangement. In addition, the refractory core 68, the upper layer 70, and the lower layer 72 may each exist as one or more of the above-described bonding material formats (e.g., an alloy foil, multiple foil layers, powder, braze paste, etc.). The PTLP bonding process may proceed as described above including the steps of melting (by direct or eutectic melting) and isothermal solidification of the upper layer 70 and the lower layer 72, during which the upper layer 70 and the lower layer 72 may diffuse into the refractory core 68. In addition, during these stages, at least one reactive element from the upper layer 70 or from the refractory core 68 may wet/adhere to the nonmetallic material of the body portion 32, and at least one reactive element from the lower layer 72 or from the refractory core 68 may diffuse into the metallic material 66 of the compliant attachment 34. Such wetting/diffusion processes may assist in creating a bond between the body portion 32 and the compliant attachment 34.

If brazing is employed to join the body portion 32 and the compliant attachment 34, an attachment surface (e.g., the bottom surface 58) of the nonmetallic body portion 32 may first be metallized using any conventional process apparent to those skilled in the art such as, but not limited to, physical vapor deposition. Similarly, if the compliant attachment 34 is nonmetallic, a metallic layer may be applied to its attachment surface (e.g., the upper surface 56) in a similar way. The braze filler may then be applied at the bonding interface 60 between the body portion 32 and the compliant attachment 34 and brazing may be carried out according to techniques apparent to those skilled in the art. The braze filler may exist as any of the above-described bonding material formats such as an alloy foil, multiple foil layers, braze paste, powder, powder compact, etc. Alternatively, the braze filler may be directly applied at the bonding interface 60 between the body portion 32 and the compliant attachment 34 without metallization of the attachment surfaces (e.g., the bottom surface 58 and the upper surface 56), and brazing may be carried out according to established techniques.

Figure 10:
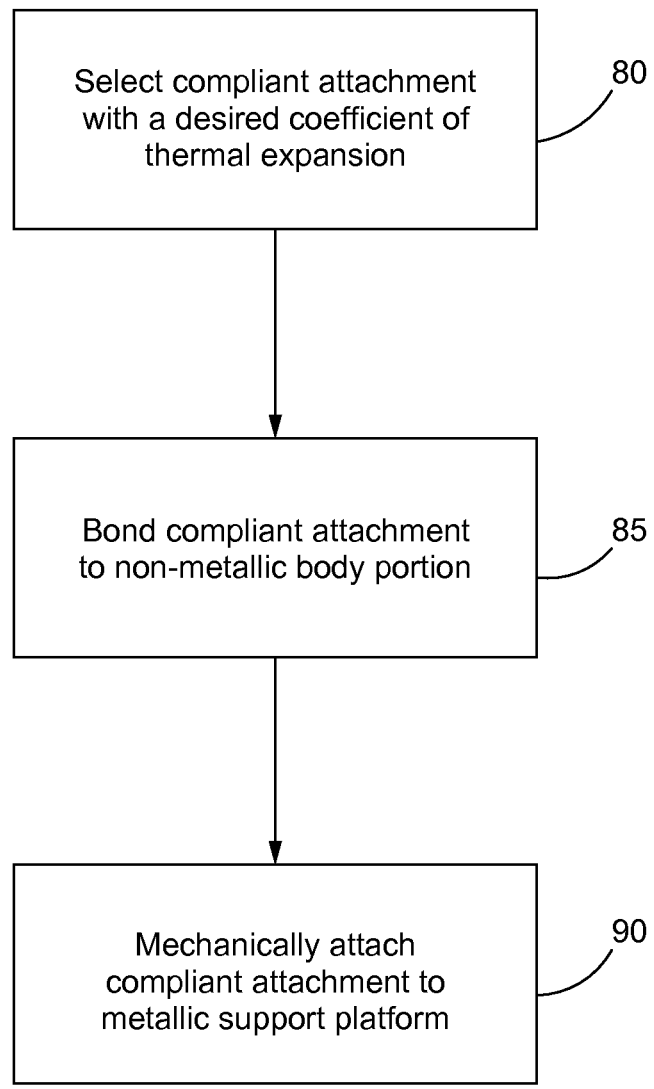
FIG. 10 is flowchart depicting a sample sequence which may be involved in fabricating the airfoil and connecting the airfoil to the support structure, in accordance with a method of the present disclosure.

A series of steps which may be carried out for fabricating the airfoil 30 and connecting the airfoil 30 to the support structure 36 are depicted in FIG. 10. Beginning with a first block 80, a compliant attachment 34 with a desired CTE that is intermediate between the CTE of the body portion 32 and the CTE of support structure 36 may be selected. The selected compliant attachment may also have a stiffness that is less than the stiffness of the body portion 32 and the stiffness of the support structure 36. According to a next block 85, the compliant attachment 34 may be bonded to the body portion 32. More specifically, the upper surface 56 of the compliant attachment 34 may be bonded to the bottom surface 58 of the body portion 32 by TLP bonding, PTLP bonding, or brazing as described in detail above, or by another suitable joining process. Upon completion of the block 85, the airfoil 30 may be provided with the compliant attachment 34 forming the root portion 35 of the airfoil 30. According to a next block 90, the airfoil 30 may be attached to the support structure 36 by the mechanical connection 50 depicted in FIG. 2 or another type of connection. Blocks 80, 85, and 90 may be repeated as necessary to provide the airfoil assembly 54 (see FIG. 2).

INDUSTRIAL APPLICABILITY

In general, it can therefore be seen that the technology disclosed herein may have industrial applicability in a variety of settings including, but not limited to, applications requiring robust connections between airfoils and support structures having thermal and/or compliance mismatches. In particular, the present disclosure introduces a nonmetallic airfoil having a compliant attachment that mechanically connects to the metallic support structure and accommodates thermal expansion mismatching between the metallic support structure and the nonmetallic body portion of the airfoil. The compliant attachment may have thermal properties intermediate between the thermal properties of the nonmetallic body portion of the airfoil and the metallic support structure, and it may have a stiffness that is lower than the stiffness of the nonmetallic body portion of the airfoil and the stiffness of the metallic support structure. By virtue of such properties, the compliant attachment may alleviate or absorb thermally-induced strain, thereby improving the robustness of the mechanical connection between the non-metallic airfoil and the metallic support structure. Furthermore, as disclosed herein, the compliant attachment may be bonded to the nonmetallic body portion of the airfoil by TLP bonding or PTLP bonding to provide a structurally resilient bond having a relatively high melting temperature. The disclosed compliant airfoil attachment may also allow for the optimal selection of the airfoil material independent of the optimal selection of the support structure material. It is expected that the technology disclosed herein may find wide industrial applicability in areas such as, but not limited to, gas turbine engine construction.

What is claimed:

1. An airfoil comprising:
   a non-metallic body portion having a leading edge, a trailing edge, a pressure side, and a suction side; and
   a compliant attachment bonded to the body portion by transient liquid phase bonding or by partial transient liquid phase bonding and being configured to connect to a support structure formed from a metallic material, the compliant attachment having a coefficient of thermal expansion intermediate between a coefficient of thermal expansion of the body portion and a coefficient of thermal expansion of the support structure, and being formed from a nonmetallic material.

2. The airfoil according to claim 1, wherein the compliant attachment is bonded to the body portion of the airfoil by transient liquid phase bonding.

3. The airfoil according to claim 1, wherein the compliant attachment is bonded to the body portion of the airfoil by partial transient liquid phase bonding.

4. The airfoil according to claim 1, wherein the compliant attachment forms a root portion of the airfoil.

5. The airfoil according to claim 1, wherein the nonmetallic material of the body portion comprises ceramic.

6. The airfoil according to claim 1, wherein the nonmetallic material of the body portion comprises a ceramic matrix composite.

7. An airfoil assembly comprising:
   a metallic support structure; and
   a plurality of airfoils each having a non-metallic body portion comprising a leading edge, a trailing edge, a pressure side, and a suction side, each of the plurality of airfoils having a compliant attachment bonded to a bottom surface of the body portion by transient liquid phase bonding or by partial transient liquid phase bonding, each compliant attachment being connected to the support structure and formed from a nonmetallic material having a coefficient of thermal expansion intermediate between a coefficient of thermal expansion of the body portion and a coefficient of thermal expansion of the support structure.

8. The airfoil assembly according to claim 7, wherein the each compliant attachment form a root portion of one of the plurality of airfoils.

9. A gas turbine engine comprising:
   a fan section;
   a compressor section downstream of the fan section;
   a combustor downstream of the compressor section;
   a turbine downstream of the combustor;
   a nacelle surrounding the fan section, the compressor section, the combustor, and the turbine;
   at least one airfoil assembly located in at least one of the fan section, the compressor section, and the turbine, the airfoil assembly comprising a metallic support structure and a plurality of airfoils each having a non-metallic body portion comprising a leading edge, a trailing edge, a pressure side, and a suction side, each of plurality of airfoils having a compliant attachment bonded to a bottom surface of the body portion by transient liquid phase bonding or by partial transient liquid phase bonding, each compliant attachment being connected to the support structure and formed from a nonmetallic material having a coefficient of thermal expansion intermediate between a coefficient of thermal expansion of the body portion and a coefficient of thermal expansion of the support structure.

10. The gas turbine engine according to claim 9, wherein each compliant attachment forms a root portion of one of the plurality of airfoils.

* * * * *